US011276216B2

United States Patent
Borovikov et al.

(10) Patent No.: US 11,276,216 B2
(45) Date of Patent: Mar. 15, 2022

(54) VIRTUAL ANIMAL CHARACTER GENERATION FROM IMAGE OR VIDEO DATA

(71) Applicant: Electronic Arts Inc., Redwood City, CA (US)

(72) Inventors: Igor Borovikov, Foster City, CA (US); Mohsen Sardari, Redwood City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/366,953

(22) Filed: Mar. 27, 2019

(65) Prior Publication Data

US 2020/0312003 A1 Oct. 1, 2020

(51) Int. Cl.
*G06T 13/40* (2011.01)
*G06N 20/00* (2019.01)
(Continued)

(52) U.S. Cl.
CPC .............. *G06T 13/40* (2013.01); *A63F 13/65* (2014.09); *A63F 13/655* (2014.09);
(Continued)

(58) Field of Classification Search
None
See application file for complete search history.

(56) References Cited

U.S. PATENT DOCUMENTS 5,274,801 A   12/1993 Gordon
5,683,082 A   11/1997 Takemoto et al.
(Continued)

FOREIGN PATENT DOCUMENTS

CN          104657412 A        5/2015
KR      10-2012-0052228        5/2012
(Continued)

OTHER PUBLICATIONS

Lieu-Hen Chen, Yu-Sheng Chen, Eri Sato-Shimokawara, Yasufumi Takama, Toru Yamaguchi, "Visualization System for Animating Vertebrate Animal Models", 2012, IEEE, 2012 Conference on Technologies and Applications of Artificial Intelligence, pp. 244-249.*

(Continued)

*Primary Examiner* — Robert Bader
(74) *Attorney, Agent, or Firm* — Knobbe, Martens, Olson & Bear, LLP

(57) ABSTRACT

Systems and methods for generating a customized virtual animal character are disclosed. A system may obtain video data or other media depicting a real animal, and then may provide the obtained media to one or more machine learning models configured to learn visual appearance and behavior information regarding the particular animal depicted in the video or other media. The system may then generate a custom visual appearance model and a custom behavior model corresponding to the real animal, which may subsequently be used to render, within a virtual environment of a video game, a virtual animal character that resembles the real animal in appearance and in-game behavior.

20 Claims, 7 Drawing Sheets

(51) Int. Cl.
- *A63F 13/65* (2014.01)
- *G06T 19/20* (2011.01)
- *G06N 3/04* (2006.01)
- *A63F 13/655* (2014.01)

(52) U.S. Cl.
CPC ........... *G06N 3/0454* (2013.01); *G06N 20/00* (2019.01); *G06T 19/20* (2013.01); *A63F 2300/66* (2013.01); *A63F 2300/69* (2013.01)

(56) References Cited

U.S. PATENT DOCUMENTS

| | | | |
|---|---|---|---|
| 6,106,395 A | 8/2000 | Begis | |
| 6,253,193 B1 | 6/2001 | Ginter et al. | |
| 6,285,380 B1* | 9/2001 | Perlin | G06N 3/004 345/473 |
| 7,390,254 B2 | 6/2008 | Hirai | |
| 7,636,701 B2 | 12/2009 | Funge et al. | |
| 8,100,770 B2 | 1/2012 | Yamazaki et al. | |
| 8,142,282 B2 | 3/2012 | Canessa et al. | |
| 8,267,764 B1 | 9/2012 | Aoki et al. | |
| 8,398,476 B1 | 3/2013 | Sidhu et al. | |
| 8,540,560 B2 | 9/2013 | Crowley et al. | |
| 8,821,290 B2 | 9/2014 | Fujisawa et al. | |
| 8,907,193 B2 | 12/2014 | Cross et al. | |
| 8,914,251 B2 | 12/2014 | Ohta | |
| 9,001,118 B2 | 4/2015 | Molyneaux et al. | |
| 9,013,489 B2 | 4/2015 | Evertt et al. | |
| 9,033,796 B2 | 5/2015 | Fujisawa et al. | |
| 9,069,441 B2 | 6/2015 | Jacob | |
| 9,616,329 B2 | 4/2017 | Szufnara et al. | |
| 9,919,217 B2 | 3/2018 | Aghdaie et al. | |
| 10,004,984 B2 | 6/2018 | Voris et al. | |
| 10,105,603 B2 | 10/2018 | Bucher | |
| 10,286,323 B2 | 5/2019 | Aghdaie et al. | |
| 10,357,718 B2 | 7/2019 | Aghdaie et al. | |
| 10,478,730 B1 | 11/2019 | Burnett | |
| 10,569,176 B2 | 2/2020 | D'angelo et al. | |
| 10,713,543 B1 | 7/2020 | Skuin et al. | |
| 10,799,798 B2 | 10/2020 | Aghdaie et al. | |
| 10,807,004 B2 | 10/2020 | Aghdaie et al. | |
| 10,839,215 B2 | 11/2020 | Somers et al. | |
| 10,940,393 B2 | 3/2021 | Somers et al. | |
| 10,953,334 B2 | 3/2021 | Kolen et al. | |
| 2004/0067788 A1 | 4/2004 | Angelopoulos | |
| 2004/0152512 A1* | 8/2004 | Collodi | A63F 13/335 463/30 |
| 2005/0130725 A1 | 6/2005 | Creamer et al. | |
| 2007/0054717 A1 | 3/2007 | Youm et al. | |
| 2007/0060364 A1 | 3/2007 | Osgood et al. | |
| 2007/0066403 A1 | 3/2007 | Conkwright | |
| 2007/0260567 A1 | 11/2007 | Funge et al. | |
| 2008/0097948 A1 | 4/2008 | Funge et al. | |
| 2008/0266250 A1 | 10/2008 | Jacob | |
| 2008/0268961 A1 | 10/2008 | Brook | |
| 2009/0202114 A1 | 8/2009 | Morin et al. | |
| 2009/0307671 A1 | 12/2009 | White et al. | |
| 2010/0144444 A1 | 6/2010 | Graham | |
| 2010/0302257 A1 | 12/2010 | Perez et al. | |
| 2011/0007079 A1* | 1/2011 | Perez | H04N 21/44218 345/473 |
| 2011/0295649 A1 | 12/2011 | Fine et al. | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0233105 A1 | 9/2012 | Cavallaro et al. | |
| 2012/0244941 A1 | 9/2012 | Ostergren et al. | |
| 2012/0276964 A1 | 11/2012 | Jones et al. | |
| 2012/0309520 A1 | 12/2012 | Evertt et al. | |
| 2013/0178281 A1 | 7/2013 | Ayyar et al. | |
| 2013/0316779 A1 | 11/2013 | Vogel | |
| 2013/0316795 A1 | 11/2013 | Vogel | |
| 2013/0342527 A1 | 12/2013 | Molyneaux et al. | |
| 2014/0235346 A1 | 8/2014 | Kim et al. | |
| 2014/0249961 A1 | 9/2014 | Zagel et al. | |
| 2014/0274370 A1 | 9/2014 | Shah | |
| 2015/0105161 A1 | 4/2015 | Sumaki et al. | |
| 2015/0213646 A1 | 7/2015 | Ma et al. | |
| 2015/0302505 A1 | 10/2015 | Di et al. | |
| 2015/0339532 A1 | 11/2015 | Sharma et al. | |
| 2016/0005270 A1 | 1/2016 | Marr et al. | |
| 2016/0067612 A1 | 3/2016 | Ntoulas et al. | |
| 2017/0259177 A1 | 9/2017 | Aghdaie et al. | |
| 2017/0312634 A1 | 11/2017 | Ledoux et al. | |
| 2017/0365102 A1 | 12/2017 | Huston et al. | |
| 2018/0001216 A1 | 1/2018 | Bruzzo et al. | |
| 2018/0161673 A1 | 6/2018 | Pasternack et al. | |
| 2018/0161682 A1 | 6/2018 | Myhill | |
| 2018/0169526 A1 | 6/2018 | Aghdaie et al. | |
| 2018/0243656 A1 | 8/2018 | Aghdaie et al. | |
| 2019/0087965 A1* | 3/2019 | Datta | G06T 7/251 |
| 2019/0184286 A1 | 6/2019 | Du et al. | |
| 2019/0197402 A1 | 6/2019 | Kovacs et al. | |
| 2019/0294881 A1* | 9/2019 | Polak | G06K 9/4628 |
| 2019/0354759 A1 | 11/2019 | Somers et al. | |
| 2019/0381407 A1 | 12/2019 | Aghdaie et al. | |
| 2019/0388789 A1 | 12/2019 | Aghdaie et al. | |
| 2020/0078685 A1 | 3/2020 | Aghdaie et al. | |
| 2020/0193671 A1* | 6/2020 | Tamir | G06T 7/251 |
| 2020/0306640 A1 | 10/2020 | Kolen et al. | |
| 2020/0342677 A1 | 10/2020 | Molyneaux et al. | |
| 2021/0001229 A1 | 1/2021 | Somers et al. | |
| 2021/0008456 A1 | 1/2021 | Somers et al. | |
| 2021/0027119 A1 | 1/2021 | Skuin et al. | |
| 2021/0086083 A1 | 3/2021 | Aghdaie et al. | |
| 2021/0093974 A1 | 4/2021 | Aghdaie et al. | |

FOREIGN PATENT DOCUMENTS

| | | |
|---|---|---|
| KR | 10-2014-0033088 | 3/2014 |
| KR | 10-2016-0115959 | 10/2016 |
| KR | 10-2016-0145732 | 12/2016 |

OTHER PUBLICATIONS

Benjamin Biggs, Thomas Roddick, Andrew Fitzgibbon, Roberto Cipolla, "Creatures Great and SMAL: Recovering the Shape and Motion of Animals from Video", Dec. 6, 2018, Springer, Computer Vision—ACCV: Asian Conference on Computer Vision 2018, pp. 3-19.*

Angjoo Kanazawa, Shubham Tulsiani, Alexei A. Efros, Jitendra Malik, "Learning Category-Specific Mesh Reconstruction from Image Collections", 2018, The European Conference on Computer Vision (ECCV), pp. 371-386.*

Chia-Jung Chou, Jui-Ting Chien, Hwann-Tzong Chen, "Self Adversarial Training for Human Pose Estimation", Nov. 15, 2018, APSIPA, Proceedings, Apsi Pa Annual Summit and Conference 2018, pp. 17-30.*

Yong Du, Wei Wang, Liang Wang, "Hierarchical Recurrent Neural Network for Skeleton Based Action Recognition", Jun. 2015, IEEE, The IEEE Conference on Computer Vision and Pattern Recognition (CVPR) 2015, pp. 1110-1118.*

Andreas Zweng, Martin Kampel, "Unexpected Human Behavior Recognition in Image Sequences using Multiple Features", Aug. 26, 2010, IEEE, 2010 20th International Conference on Pattern Recognition, pp. 368-371.*

Maria-Virginia Aponte, Guillaume Levieux, Stephane Natkin, "Measuring the level of difficulty in single player video games", 2011, Elsevier, Entertainment Computing.

Jamey Pittman, "The Pac-Man Dossier", Gamasutra, downloaded on Jun. 1, 2018, available at <<https://web.archive.org/web/20161107115846/https://www.gamasutra.com/view/feature/3938/the_pacman_dossier.php?print=1>>.

Chris Pruett, Defining the All-Important Difficulty Curve, The Journal of Education, Community, and Value, vol. 8, Issue 1, Jan.-Feb. 2008, http://com mons.pacificu.edu/cg i/viewcontent.cg i?article=1 002&context=inter08.

Shorten, Connor, "Image-to-Image Translation with Conditional Adversarial Networks", Pix2Pix, https://towardsdatascience.com/pix2pix.869c17900998?gi=e4c177e8a7c7, Jan. 29, 2019.

(56) References Cited

OTHER PUBLICATIONS

Mehta, Dushyant et al., "Vnect: Real-time 3D Human Pose Estimation with a Single RGB Camera",. ACM Transactions on Graphics, vol. 36, No. 4, Article 44. Published Jul. 2017.
Shih, Liang-Yu et al., "Video-based Motion Capturing for Skelton-based 3D Models", National Taiwan University.
Van De Panne, Michiel, "Control for Simulated Human and Animal Motion", Department of Computer Science, University of Toronto, 1998.
Davis, James et al., "A Sketching Interface for Articulated Figure Animation", Eurographics/SIGGRAPH Symposium on Computer Animation (2003).
Isola, Phillip et al., "Image-to-Image Translation with Conditional Adversarial Networks", Berkeley AI Research (BAIR) Laboratory, UC Berkeley, Nov. 26, 2018.
Aristidou, A. et al., "Inverse Kinematics Techniques in Computer Graphics: A Survey", Computer Graphics Forum, vol. 00 (2017), No. 00 pp. 1-24.
Bengio, et al., Curriculum Learning, Proceedings of the 26th International Conference on Machine Learning, 2009, in 8 pages.
Donges, Niklas, Transfer Learning—Towards Data Science, Apr. 23, 2018, https://towardsdatascience.com/transfer-learning-946518f95666.
Ho, et al., Generative Adversarial Imitation Learning, pp. 1-14, arXiv:1606.03476v1 [cs.LG]; Jun. 10, 2016.

\* cited by examiner

VIRTUAL ANIMAL CHARACTER GENERATION FROM IMAGE OR VIDEO DATA

INCORPORATION BY REFERENCE TO ANY PRIORITY APPLICATIONS

Any and all applications for which a foreign or domestic priority claim is identified in the Application Data Sheet as filed with the present application are hereby incorporated by reference.

BACKGROUND

Video game applications have increased in popularity and complexity in recent years. As more players enter the virtual environments of video games, many of which include in-game online interactions with other players, many players desire increased customization options for the virtual characters that they control in these virtual environments. This is particularly true in multi-player video games, where a player will often seek to personalize an avatar or character that will be visible to other players in the game. Some games make a variety of predefined characters available, from which a player may choose a character to control or play as in a given game instance. Other games enable at least some level of customization of predefined characters, such as providing an option for a player to edit a selected character's clothing color or other aspect of the character's visual appearance in the game.

SUMMARY OF EMBODIMENTS

The systems, methods, and devices of this disclosure each have several innovative aspects, no single one of which is solely responsible for the all of the desirable attributes disclosed herein.

In some embodiments, a system includes a data store that stores three-dimensional (3D) model data for each of a plurality of animal types, and a computing system in electronic communication with the data store that is configured to execute computer-readable instructions. The instructions may configure the computing system to obtain input media depicting a real animal, wherein the input media comprises at least a video recording of the real animal as captured by a camera; determine that the real animal is of a first animal type; retrieve base 3D model data for the first animal type from the data store; provide at least a portion of the input media to a first machine learning model configured to extract visual information regarding one or more animals depicted in image or video data; alter the base 3D model data for the first animal type based on visual information extracted by the first machine learning model to generate custom 3D model data corresponding to the real animal; provide the input media to a second machine learning model configured to determine behavior of one or more animals depicted in video data; generate custom behavior data corresponding to the real animal, wherein the custom behavior data indicates at least one of (a) a sequence of actions performed by the real animal as depicted in the input media or (b) skeletal movement information associated with an action performed by the real animal as depicted in the input media; and render, within a 3D virtual environment of a video game, a series of frames for display that depict a virtual animal character that resembles the real animal performing one or more actions, wherein a visual appearance of the virtual animal character as rendered is based at least in part on the custom 3D model data, wherein the one or more actions are based at least in part on the custom behavior data.

The computer system above can have one, all, or any combination of the following features. The computer-readable instructions may further configure the computing system to store, in the data store, custom virtual animal character data corresponding to the real animal, wherein the custom virtual animal character data includes at least the custom 3D model data and the custom behavior data. The computer-readable instructions may further configure the computing system to provide the custom virtual animal character data to two or more video game applications for incorporation of the virtual animal character into virtual worlds associated with each of the two or more video game applications. The individual animal type of the plurality of animal types may comprise at least one of an animal species or breed. The custom 3D model data corresponding to the real animal may comprise a custom texture extracted from the input media. The first machine learning model may comprise a generative adversarial network that includes a generator and a discriminator. The second machine learning model may comprise a convolutional neural network, wherein the computing system is configured to apply kinematic skeleton fitting to output of the convolutional neural network.

Other embodiments include a computer-implemented method. The method may include, under the control of a computer system comprising computer hardware, the computer system configured with computer executable instructions: obtaining input media depicting a real animal as captured by a camera; obtaining base three-dimensional (3D) model data for an animal; providing at least a portion of the input media to a first machine learning model configured to extract visual information regarding one or more animals depicted in image or video data; modifying the base 3D model data based on visual information extracted by the first machine learning model to generate custom 3D model data corresponding to the real animal; providing the input media to a second machine learning model configured to determine behavior of one or more animals depicted in image or video data; generating a custom behavior model corresponding to the real animal, wherein the custom behavior model indicates at least a sequence of actions performed by the real animal as depicted in the input media; and storing, in a data store that stores virtual character data for virtual characters that populate a virtual world in least one video game, virtual animal character data for a custom virtual animal character, wherein the virtual animal character data comprises at least the custom 3D model and the custom behavior model.

The computer-implemented method above can have one, all, or any combination of the following features. The computer-implemented method may further comprise rendering, within a 3D virtual environment of a video game, a series of frames for display that depict the custom virtual animal character that resembles the real animal performing one or more actions, wherein a visual appearance of the virtual animal character as rendered is based at least in part on the custom 3D model data, wherein the one or more actions are based at least in part on the custom behavior model. The custom behavior model may further include skeletal movement information associated with an action performed by the real animal as depicted in the input media. The method may further comprise determining that the real animal performs the action in the input media in a manner that deviates from a standard corresponding action stored in a generic behavior model. The custom behavior model may comprise a behavior tree. Generating the custom behavior model may include application of at least one of a Markov model or a deep neural network. The method may further comprise: receiving user feedback indicating that the custom virtual animal character behaved within a virtual world of a video game in a manner inconsistent with real world behavior of the real animal; and in response to the user feedback, modifying at least a portion of the custom behavior model to suppress one or more behaviors corresponding to the user feedback.

Other embodiments include a non-transitory computer-readable storage medium having stored thereon computer-readable instructions that, when executed, configure a computing system to: obtain input media depicting a real animal; obtain base three-dimensional (3D) model data; provide at least a portion of the input media to a first machine learning model configured to extract visual information regarding one or more animals depicted in image or video data; modify the base 3D model data based on visual information extracted by the first machine learning model to generate custom 3D model data corresponding to the real animal; provide the input media to a second machine learning model configured to determine behavior of one or more animals depicted in image or video data; generate a custom behavior model corresponding to the real animal, wherein the custom behavior model indicates at least a sequence of actions performed by the real animal as depicted in the input media; and store, in a data store associated with at least one video game, virtual animal character data for a custom virtual animal character, wherein the virtual animal character data comprises at least the custom 3D model and the custom behavior model.

The above non-transitory computer-readable storage medium and/or instructions stored thereon can have one, all, or any combination of the following features. The instructions may further configure the computing system to render, within a 3D virtual environment of a video game, a series of frames for display that depict the custom virtual animal character that resembles the real animal performing one or more actions, wherein a visual appearance of the virtual animal character as rendered is based at least in part on the custom 3D model data, wherein the one or more actions are based at least in part on the custom behavior model. The real animal may be a real pet of a video game player, and the input media may be obtained from at least one of (a) a computing device of the video game player or (b) a third party media account associated with the video game player. At least a portion of the input media may be obtained from at least one of: a social network account, a cloud storage service, a home security video camera service, or a pet camera video monitoring service. The input media may comprise video data having a duration of at least a plurality of minutes. The instructions may further configure the computing system to: receive user feedback indicating that the custom virtual animal character behaved within a virtual world of a video game in a manner inconsistent with real world behavior of the real animal; and modify at least a portion of the custom behavior model to suppress one or more behaviors corresponding to the user feedback.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1:
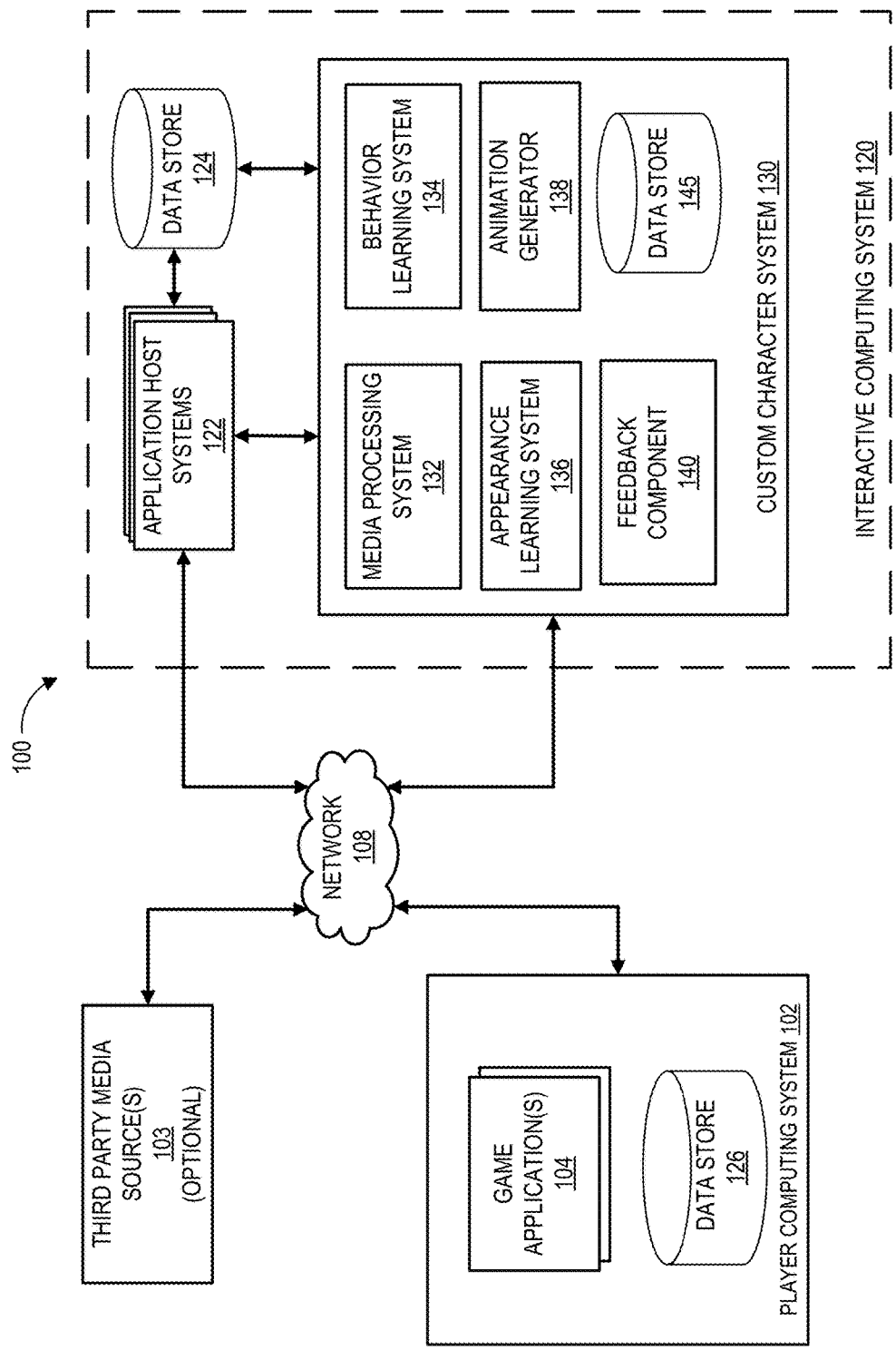
FIG. 1 illustrates an embodiment of a networked computing environment for implementing one or more embodiments of a custom character system.

Video games and other programs often include software-controlled virtual entities. In video games, these virtual entities may sometimes be referred to as computer players, bots, artificial intelligence ("AI") units, AI characters, or non-player characters ("NPCs"). NPCs can be programmed to respond to in-game stimuli (such as in game actions or occurrences involving other NPCs or player-controlled characters) in a manner that appears realistic to a human player. The behavior programmed for a given NPC may be specific to a certain character type of the NPC (e.g., a human, a specific type of animal, a monster, an alien, etc.), a trait assigned to the NPC (e.g., reckless, friendly, aggressive, shy, etc.), a role assigned to the NPC (e.g., teammate, enemy, shopkeeper, boss, etc.), and/or other factors.

One type of NPC appearing in some video games is an animal companion or virtual pet. For example, a game may, either by default or at the direction of a user, include a dog, cat, bird or other animal as an NPC. In one example, a player may explore a 3D virtual environment controlling a human character that appears in that environment, while a pet dog character walks with the human character. As another example, a player may control a human character that appears as a pirate, and the game may include a pet parrot character that stands on the pirate's shoulder, flies near the pirate, etc. As yet another example, a simulation game may enable a player to create both human and pet characters that interact within a virtual home or town, such as by creating a family of virtual human characters and one or more virtual pet characters that interact within the virtual environment of the game.

A player may desire to have an in-game virtual pet or other virtual animal character be a virtual replica or virtual version of the player's real life pet. A problem with existing video game character systems in this regard is that a player may enjoy that a particular video game enables the player to have a virtual dog accompany the player's character on a mission within the video game, but may dislike that the virtual dog provided in the game does not look like the player's own real life dog. As a further example, a player may find that a particular video game provides an in-game virtual animal that looks at least somewhat similar to the player's real life pet (e.g., the virtual dog may be the same breed and color as the player's real life dog), but which may behave very differently than the player's real life dog. For example, the player's real life dog may be shy and never bark, while the virtual dog in the particular video game has been programmed to run around exploring a 3D virtual environment and barking frequently. This may cause the player to be less emotionally invested in the virtual dog character or the game as a whole as he would be if the virtual dog seemed like his own real life dog.

Aspects of the present disclosure address the above problems and others by providing automated systems and methods for generating a virtual animal character from input media depicting a specific real life animal, where the generated virtual animal character may include customized textures, 3D model data and behavior models that are all determined from the input media. The input media itself or access to the input media may be provided by the player to a custom character system described herein. For example, a player may provide a custom character system with images and/or videos depicting the player's real life pet. Alternatively or additionally, the player may enable the video game system to access a third party media source, such as a social media account or social network account of the player, a cloud storage service used by the player to store digital media, home security camera or pet camera video monitoring services, and/or other sources of media depicting the player's pet.

As will be described in detail below, a custom character system described herein may analyze the input media depicting the player's real life pet or other animal in order to learn various aspects of the animal's appearance and behavior. In some embodiments, the custom character system may use one or more generic or base appearance models and/or behavior models as starting points (e.g., may have access to stored templates or models for specific species or breeds of animals). The custom character system may then modify these generic or base models based on specific observed or detected aspects of the real life animal depicted in the input media, such as recorded videos or live video streams of the animal. The custom character system may ultimately generate and store various custom data for the specific animal, such as 3D mesh or other geometry or 3D object data, textures, animation data, behavior trees or other behavior models, voice or sound data, and/or other data. This custom set of data may then be used to render a virtual character version of the real life animal in one or more video games. In some embodiments, the virtual character may be rendered with realistic appearance and behavior that mimics the real life animal. In other embodiments, alterations may be made to the appearance and/or behavior of the virtual character relative to the real life animal for purposes of a particular video game, such as to enable the virtual version of a real life fish (where the real fish lives in real life underwater within a fish tank of the player) to fly within a virtual 3D environment or to behave in a manner at least somewhat similar to a virtual dog, parrot or other animal that the fish character replaces within the game (e.g., walk upright, sit on a human virtual character's shoulder, and/or other behavior).

Overview of Custom Character System and Operating Environment

FIG. 1 illustrates an embodiment of a computing environment 100 for implementing a custom character system 130, according to some embodiments. The environment 100 includes a network 108, a player computing system 102, one or more optional third party media sources or services 103, and an interactive computing system 120. To simplify discussion and not to limit the present disclosure, FIG. 1 illustrates only one player computing system 102 and one interactive computing system 120, though multiple systems may be used.

The interactive computing system 120 can include application host systems 122, one or more data stores 124, and a custom character system 130. The custom character system 130 can communicate with data store 124 and/or with the application host systems 122 to acquire data associated with a game application and to provide custom character data for use in a game application. The custom character system 130 can additionally or alternatively communicate with player computing system 102 and/or one or more third party media sources 103 through the network 108. Although only one network 108 is illustrated, multiple distinct and/or distributed networks may exist. The various systems and other components illustrated in FIG. 1, including interactions or communications between them, will now be described in more detail below.

A. Interactive Computing System

In the illustrated embodiment, the interactive computing system 120 includes application host systems 122, a data store 124, and a custom character system 130. These systems may communicate with each other. For example, the custom character system 130 can obtain data associated with a game application from the application host systems 122 and can provide custom character data to the application host systems 122 and/or for storage in the data store 124. The application host systems 122 can communicate with the data store 124 to execute and/or host a game application. In certain embodiments, the interactive computing system 120 may be associated with a network-based service, which may be operated by a game publisher, game developer, platform provider or other entity.

1. Application Host Systems

The application host systems 122 can be configured to execute a portion of the game application 104 operating on the player computing system 102 and/or a host application (not illustrated) on the interactive computing system 120. In certain embodiments, the application host systems 122 may execute another application instead of or in addition to executing a portion of the game application 104 and/or a host application, which may complement and/or interact with the game application 104 during execution of a gameplay session of the game application 104. Further details regarding application host systems are described below.

The interactive computing system 120 may enable multiple players or computing systems to access a portion of the game application 104 and/or a host application. In some embodiments, the portion of the game application 104 executed by application host systems 122 of the interactive computing system 120 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the interactive computing system 120. A set of players may be assigned to or may access one instance of the persistent virtual world while another set of players may be assigned to or may access another instance of the persistent virtual world.

In some embodiments, the application host systems 122 may execute a hosting system for executing various aspects of a game environment. For example, in one embodiment, the game application 104 may be a competitive game, such as a first person shooter or sports game, and the host application system 122 can provide a dedicated hosting service for hosting multiplayer game instances or facilitate the creation of game instances hosted by player computing devices. In some embodiments, the application host systems 122 can provide a lobby or other environment for players to virtually interact with one another. In some embodiments, the virtual environments may be populated with one or more virtual characters generated by the custom character system 130, as well as one or more characters designed by a game developer.

2. Custom Character System

As will be described in further detail herein, the custom character system 130 can communicate with other systems to acquire media and other data, may generate one or more custom virtual characters based on the media and other data, and then may make these virtual characters available for use as an NPC or player-controlled character within a game or other virtual world. The custom character system 130 can include one or more systems, subsystems or components for implementing various functionality described herein. For example, the custom character system 130 can include a media processing system 132, behavior learning system 134, appearance learning system 136, animation generator 138, and feedback component 140. These example systems or components are not intended to be limiting, and the custom character system 130 may include fewer or more systems or components than illustrated or described. For example, in some embodiments, a separate auditory learning system could be included within the custom character system 134 to learn unique sounds, vocal characteristics or similar auditory information associated with a real life animal, or this functionality could instead be implemented by the appearance learning system 136.

The custom character system 130 and its various systems or components may be distributed across multiple computing systems. The various systems of the custom character system 130 can communicate with each other to obtain data, analyze data, and generate virtual character data. While various systems are illustrated as part of the interactive computing system 120 and/or custom character system 130, it will be appreciated that each system's functionality could be implemented by a different or multiple computing systems or devices. Furthermore, a single system could implement functionality described herein as being provided or implemented by multiple systems in communication with each other. Similarly, functionality described as being provided by the customer character system 120 of the interactive computing system 120 could instead be implemented at a player computing system 102, in other embodiments. Each system or component of the custom character system 130 is described generally below, with associated functionality further described subsequently with respect to other figures.

a. Media Processing System

The media processing system 132 may be configured to obtain, receive or retrieve image, video and/or audio data from a variety of sources, depending on the embodiment. For example, as will be described further herein, the media processing system 132 may obtain images (such as digital photographs), videos and/or other media items or files from the player computing system 102, third party media sources 103, and/or other source. The media processing system may be configured to communicate via various APIs or other protocols specific to a particular service or system that stores particular media data. In some embodiments, the obtained media may include videos and/or images depicting a player's real life pet or other animal, as captured by a camera (such as a mobile phone's camera, a standalone digital camera, a security camera, a pet camera, and/or other device).

In some embodiments, the media processing system 132 may perform initial analysis of the media prior to providing the media or related data to the behavior learning system 134 and/or appearance learning system 136. For example, the media processing system 132 may perform image segmentation analysis, object detection, and/or provide the input media as input to various machine learning models in order to identify the images, video frames and/or other portions of the input media that depict an animal of interest to custom character system 130.

b. Behavior Learning System

The behavior learning system 134 may be configured to analyze input media, such as images or videos depicting an animal to be generated as a virtual character, to learn unique behaviors of that animal. As will be described below, the behavior learning system 134 may output a behavior tree or other behavior model representing how the particular pet or other animal depicted in the input media behaves, such as by identifying common sequences of actions performed by the animal, unique actions performed by the animal as observed in the input media, and the like. The behavior learning system may employ various modeling techniques or approaches, such as an ensemble of Markov models and/or deep neural network models. The behavior learning system 132 may additionally perform semantic analysis of input media, such as video, in order to extract or determine traits of the animal, such as whether the animal is generally playful, sleepy, feisty, etc.

c. Appearance Learning System

The appearance learning system 136 may be configured to analyze input media, such as images or videos depicting an animal to be generated as a virtual character, to learn unique visual characteristics or appearance details of that animal. As will be described below, the appearance learning system 136 may apply visual style extraction techniques as one or more learned models in order to apply a style to a 3D model, which may include generating textures to apply to a 3D model. An initial 3D model, such as 3D mesh data, may be used as a base or template, where the initial 3D model is associated with a particular species and/or breed of the animal. The appearance learning system 136 may additionally alter the 3D model data to better match the animal's appearance, as will be further described below. In some embodiments, the appearance learning system may additionally learn auditory information associated with the animal from sound recordings and/or the audio data of videos to generate either a model that reflects sound or vocal traits of the animal to generate realistic audio output that mimics the sound of the real animal, and/or to store audio samples representative of certain sounds made by the animal (e.g., a sample bark, a sample weep, a sample snore, a sample yelp, etc.). The audio data or model may be associated with the behavior model discussed herein in order for appropriate sounds to be generated for the virtual animal character based on in-game occurrences.

d. Animation Generator

The animation generator 138, which may operate in conjunction or cooperation with the behavior learning system 134, may be configured to generate animation data for a virtual animal character to move in a manner that mimics or approximates specific movements performed by the real life animal depicted in input media. For example, while the behavior learning system 134 may determine that the real life animal depicted in a video was running if certain frames of the video, the animation generator may determine skeletal motion from pixel data of those frames in order to generate animation or a series of skeletal movements that can be applied to a virtual animal character to make the virtual animal character appear to run in a similar manner as the real animal in the video. Functionality implemented by the animation generator 138 may include application of deep neural networks or other machine learning models, in some embodiments, as will be described in more detail below.

e. Feedback Component

The feedback component 140 may be configured to receive feedback, such as feedback from the player utilizing player computing system 102, regarding a custom animal character generated by the custom character system 130. For example, the feedback component 140 may prompt or otherwise enable the player, via a user interface or within a game, to indicate whether the appearance and/or behavior of the virtual animal character generated by the custom character system 120 appears correct (e.g., mimics the real life animal as intended). For example, the player may indicate that a certain action just performed by a virtual dog character in a game would not be performed by the player's own real life dog, may indicate that the extent or details of an action performed by the virtual dog character was incorrect (e.g., the virtual dog jumped too high, ran too slow, etc.), and/or may indicate that a series of actions performed by the virtual dog would not be performed by the real dog (e.g., the real dog would not bark immediately after waking up). The feedback component 140 may then, such as in cooperation with the behavior learning system 134, apply the feedback in order to adjust the virtual animal's behavior to enforce correct behavior and suppress incorrect behavior.

f. Character Data Store

The custom character system 130 can include a data store 145. The data store 145 can be configured to store data such as generic character models (such as models for particular species of animals, breeds of a species, etc.), as well as custom character models (both appearance and behavior) generated by the appearance learning system 136 and/or behavior learning system 134. The data store 145 may be distributed across multiple computing devices (see for example computing device 10 in FIG. 7). In some embodiments, the data store 145 may be network-based storage system where data may be stored in different locations.

3. Data Store of Interactive Computing System

The interactive computing system 120 can include a data store 124. The data store 124 can be configured to store data acquired by other systems, such as, for example, telemetry data, video data, game state information, user data, or the like. In some embodiments, the data store 124 may store user account data associated with a video game publisher, a game platform provider or other service that enables a user to maintain preferences, virtual characters, avatars, achievements, and/or other data across a plurality of different video games. The data store 124 may be distributed across multiple computing devices (see for example computing device 10 in FIG. 7). In some embodiments, the data store 124 may be network-based storage system where data may be stored in different locations.

B. Player Computing System

The player computing system 102 can be controlled by a user, such as a player of a video game. The player computing system 102 may include hardware and software components for establishing communications over a communication network 108. For example, the player computing system 102 may be equipped with networking equipment and network software applications (for example, a web browser) that facilitates communications via one or more networks (for example, the Internet or an intranet). The player computing system 102 may have varied local computing resources such as central processing units and architectures, memory, mass storage, graphics processing units, communication network availability and bandwidth, and so forth. Further, the player computing system 102 may include any type of computing system. For example, the player computing system 102 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the player computing system 102 may include one or more of the components or embodiments described below.

1. Game Application(s) and Host Application System

The player computing system 102 is capable of executing one or more game applications 104, which may be stored and/or executed locally and/or in a distributed environment. In a locally executed game application 104, generally, the game does not rely or utilize an external computing system (for example, the interactive computing system 120) to execute the game application. In some instances, a locally executable game can communicate with an external server to retrieve information associated with the game, such as game patches, game authentication, clouds saves, custom virtual character data, user account data, or other features. In distributed game applications, the player computing system 102 may execute a portion of a game and the interactive computing system 120, or an application host system 122 of the interactive computing system 120 may execute another portion of the game. For instance, the game may be a massively multiplayer online role-playing game (MMORPG) that includes a client portion executed by the player computing system 102 and a server portion executed by one or more application host systems 122. For the present discussion, the type of game application 104 can be a locally executable game, a distributed application, or an application that includes a portion that executes on the player computing system 102 and a portion that executes on at least one of the application host systems 122.

2. Player Data Store

The player computing system 102 can include a data store 126. The data store 126 can be configured to store data associated with one or more game applications 104, local account data associated with an account maintained for the player by the interactive computing system 120, virtual characters created by the player that are usable in one or more games, and/or other game-related or account-related data. In some embodiments, the player may utilize storage of the player computing system 102, such as data store 126, to store various personal photos, videos, sound recordings, files, and other information that a player may generally choose to store on a personal desktop or laptop computer, for instance. Thus, in some embodiments, the data store 126 may store image and/or videos of a player's real life pet, whether or not the player chose to store those images or videos for purposes of use in generating custom virtual characters or for unrelated reasons. The data store 126 may be distributed across multiple computing devices (see for example computing device 10 in FIG. 7).

3. Optional Browser or Other Application

Though not illustrated in FIG. 1, the player computing system 102 may include a browser application or other application (such as a standalone account management application associated with a game publisher or game platform) via which the player utilizing player computing system 102 can interact with the interactive computing system 120 outside of any particular game application 104. For example, the player may be able to utilize such a browser or application to interact with user interfaces that enable the player to customize a virtual character that can be used across a number of different game applications associated with a user account of the player.

C. Third Party Media Source(s)

The player computing system 102 and/or interactive computing system 120 may be in communication via the network 108 with one or more third party media sources 103. The third party media sources 103 may generally be one or more services that have either streaming or stored media data (such as images, sound recordings, and/or videos) of the player and/or the player's real life pet(s) or other animal(s). For examples, the third party media sources 103 may include a social media service or social network service, a cloud storage service, home security camera or pet camera video monitoring services, and/or other sources of personal recorded or streaming media associated with the player. The player may have a user account with each such third party media source or service, the credentials of which (such as user name and password) the player may select to provide to a game application 104 and/or the interactive computing system 120 in order for certain images or videos accessible via the given service or source to be accessible by the game application 104 and/or the interactive computing system 120. In some embodiments, communications between a given third party media source 103 and the game application 104 or the interactive computing system 120 may be via an application programming interface (API) provided by the given third party media source.

D. Other Considerations

Although the various systems are described separately above, it should be noted that one or more of these systems may be combined together. For example, the interactive computing system 120 may provide functionality similar to one or more third party media sources 103. Additionally, one or more of the systems may be executed by the same computing device (see for example, computing device 10 in FIG. 7) or by a different computing system than illustrated in FIG. 1. For example, the custom character system 130 may be executed on the same computing device as the player computing system 102. On the other hand, one or more systems may be executed by multiple computing devices. For example, a portion or subsystem of the custom character system 130 may be implemented by a player's personal computer or the player computing system 102 while another portion or subsystem may be implemented by a server.

Illustrative Methods for Virtual Animal Character Generation

Figure 2:
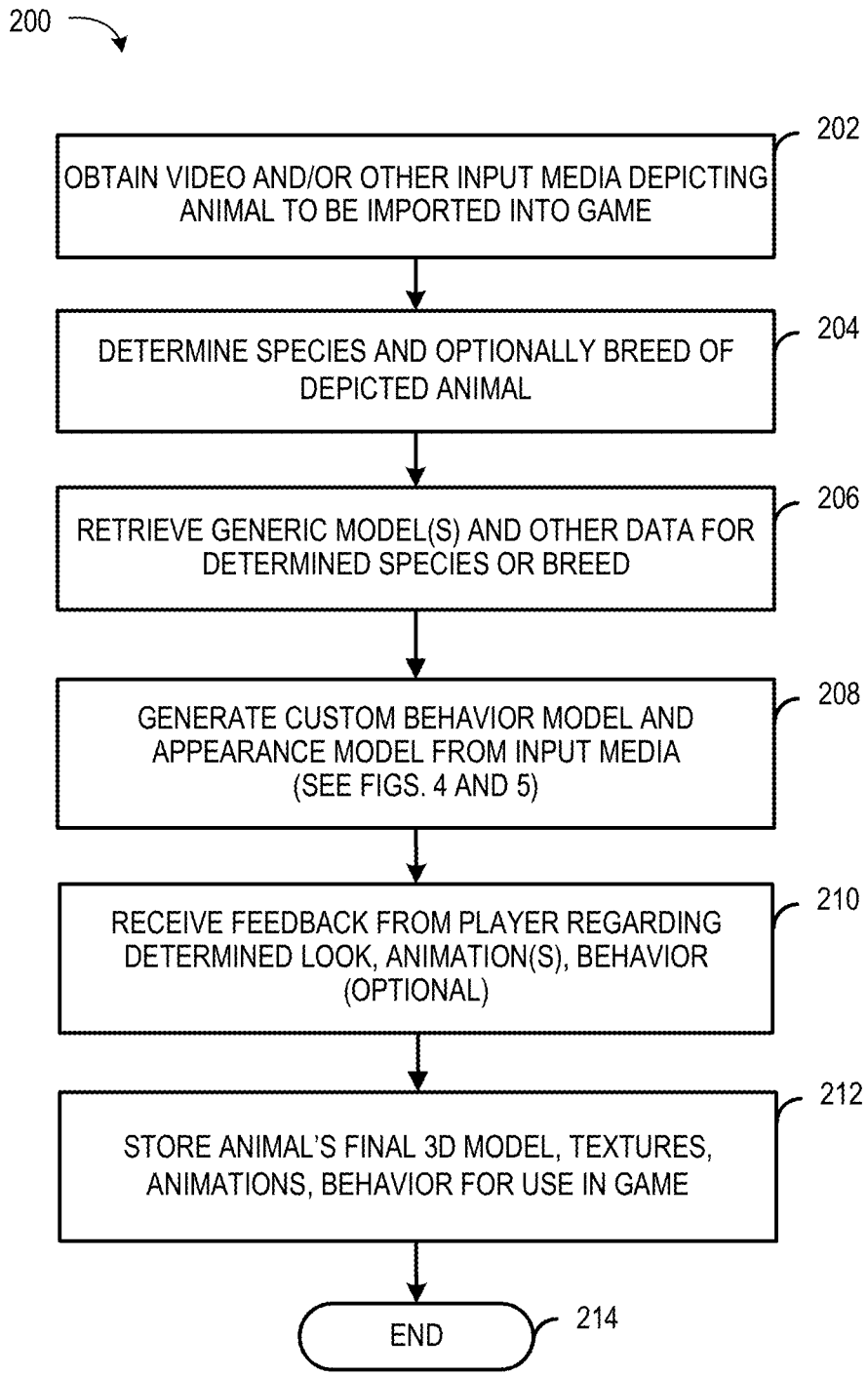
FIG. 2 is a flow diagram of an illustrative method for generating and storing virtual animal character models based on automated analysis of input media depicting a real life animal, according to some embodiments.

FIG. 2 is a flow diagram of an illustrative method 200 for generating and storing virtual animal character models based on automated analysis of input media depicting a real life animal, according to some embodiments. In some embodiments, the method 200, in whole or in part, can be implemented by a game application 104, a custom character system 130, a player computing system 102, an interactive computing system 120, or other application component or module. Although any number of systems, in whole or in part, can implement the method 200, to simplify discussion, the method 200 will be described with respect to particular systems or components of the custom character system 130.

The illustrative method 200 begins at block 202, where the media processing system 132 may obtain video data, image data and/or other input media depicting an animal to be imported into a game or otherwise made into a virtual version of the animal. The input media may be provided by a player, such as by the player selecting to upload images or videos of the player's pet from player computing system 102 (or another computing device of the player's) to the interactive computing system 120. The player may do so via an in-game user interface generated by a game application 104, or via a browser or other user interface generated by the interactive computing system 120. Alternatively or additionally, the player may enable the interactive computing system 120 to access a third party media source 103, such as a social media account or social network account of the player, a cloud storage service used by the player to store digital media, home security camera or pet camera video monitoring services, and/or other sources of media depicting the player's pet, as discussed above.

The images and/or video obtained at block 202 may have been originally captured by a camera of the player using a traditional two-dimensional (2D) camera, as the virtual character generation techniques described herein do not require 3D sensor data to be associated with the input media. However, the custom character system 130 may be configured to process and take into account 3D sensor information associated with the input media in cases where a given player captured the input media utilizing a camera with 3D sensor information (such as a Kinect sensor).

The animal depicted in the input media obtained at block 202 may be any of a variety of types (such as any of a variety of different animal species, or breeds within a species). In some embodiments, the custom character system 130 may be configured to generate virtual character versions of a certain predetermined list or set of animals, such as types of animals commonly kept as pets (e.g., dogs, cats, turtles, rabbits, birds, and/or others) or the types of animals supported by a particular video game (e.g., a dog that accompanies an explorer character in a game, a parrot that accompanies a pirate in another game, and so on). In other embodiments, the custom character system 130 may be configured with sufficient generic or base 3D models that it may be capable of modifying at least one base model to appear similar to any animal types that share certain broad features or categories of appearance. For example, in such an embodiment, the custom character system 130 may not have been specifically configured to identify a pig and may not have access to a stored pig model, but may nonetheless be capable of generating a 3D model for a particular pig depicted in a video by utilizing a generic four-legged mammal model as a starting point to modify based on video analysis.

At block 204, the media processing system 132 or appearance learning system 136 may determine the species and optionally breed of the animal depicted. In some embodiments, the species and optionally breed of animal may be automatically detected using computer vision techniques, such as one or more neural networks or classification models. In other embodiments, the player may provide input via a user interface displayed by the player computing system 102 indicating the species or breed of the player's pet. For example, prior to or in association with the player providing the custom character system 130 with access to images and/or videos of the player's dog to be used in generating a custom virtual animal character for use in a video game, that player may have selected via a user interface that the player desired to create a custom virtual dog (optionally of a particular indicated dog breed).

Next, at block 206, the custom character system 120 may retrieve or obtain one or more generic models and other data corresponding to the determined species or breed of the animal depicted in the input media. For example, the appearance learning system 136 may obtain a generic 3D mesh or other 3D model data associated with the animal species or breed from the data store 145, and the behavior learning system 134 may obtain generic behavior data associated with the animal species or breed from the data store 145. The number of different available generic or base models may vary between embodiments. For example, in some embodiments, the custom character system 130 may have only a small number of standard or base models that each apply to a different broad categorizations of animals, such as a bird model, a quadruped model (e.g., for use across various four-legged mammals), and a biped model. In other embodiments, the custom character system 130 may have access to species-specific base models, such as a dog model, a cat model, a horse model, a bird model, a parrot model, a dove model, etc. In still further embodiments, the custom character system 130 may have access to multiple base models for a particular species, which may be labeled by breeds within that species. For example according to some embodiments, the custom character system 130 may have access to separate base or generic models for each of a number of different dog breeds, such as a poodle model, a bulldog model, a German shepherd model, and/or the like.

At block 208, the custom character system 130 may generate one or more custom behavior models and one or more custom appearance models from the input media. In some embodiments, a custom behavior model may be generated by the behavior learning system 134, and a custom appearance model (which may include custom 3D mesh data and corresponding textures) may be generated by the appearance learning system 136. Illustrative methods for generating such models will be described in detail below with reference to FIGS. 4 and 5. The appearance model and the behavior model may be generated in either order or in parallel, depending on the embodiment.

Next, at block 210, the feedback component 140 may optionally receive feedback from a player regarding the virtual animal character's generated appearance or behavior as rendered either in a game or in a character review user interface. For example, the player may provide input via one or more in-game controls or a user interface indicating that certain behaviors or appearance features of the virtual animal character generated by the custom character system 130 either do or do not accurately reflect the player's real life pet that the virtual animal character was intended to replicate in virtual form. An illustrative user interface for providing such feedback will be described below with respect to FIG. 6. The generated custom appearance or behavior models may be modified by the custom character system 130 based on the feedback, as will be further described below.

Once any initial optional feedback has been received and incorporated into the appearance and behavior models, the custom character system 130 may store the virtual animal's final 3D model, textures, animations, behaviors and/or other data for use in one or more games, at block 212. Depending on the embodiment, the custom virtual character may be stored in one or more of data store 145, data store 124 and/or data store 126. The method 200 ends at block 214. In some embodiments, the stored data may include at least some data specific to a particular game in which the virtual animal character may be incorporated. For example, the behavior data or visual data may include information that incorporates an aspect of the game into the learned real life appearance or behavior of the real animal, such as indicating that a particular virtual dog character should carry a player's virtual ammo or virtual healing potion in a particular video game in the dog's mouth rather than on the dog's back.

Figure 3:
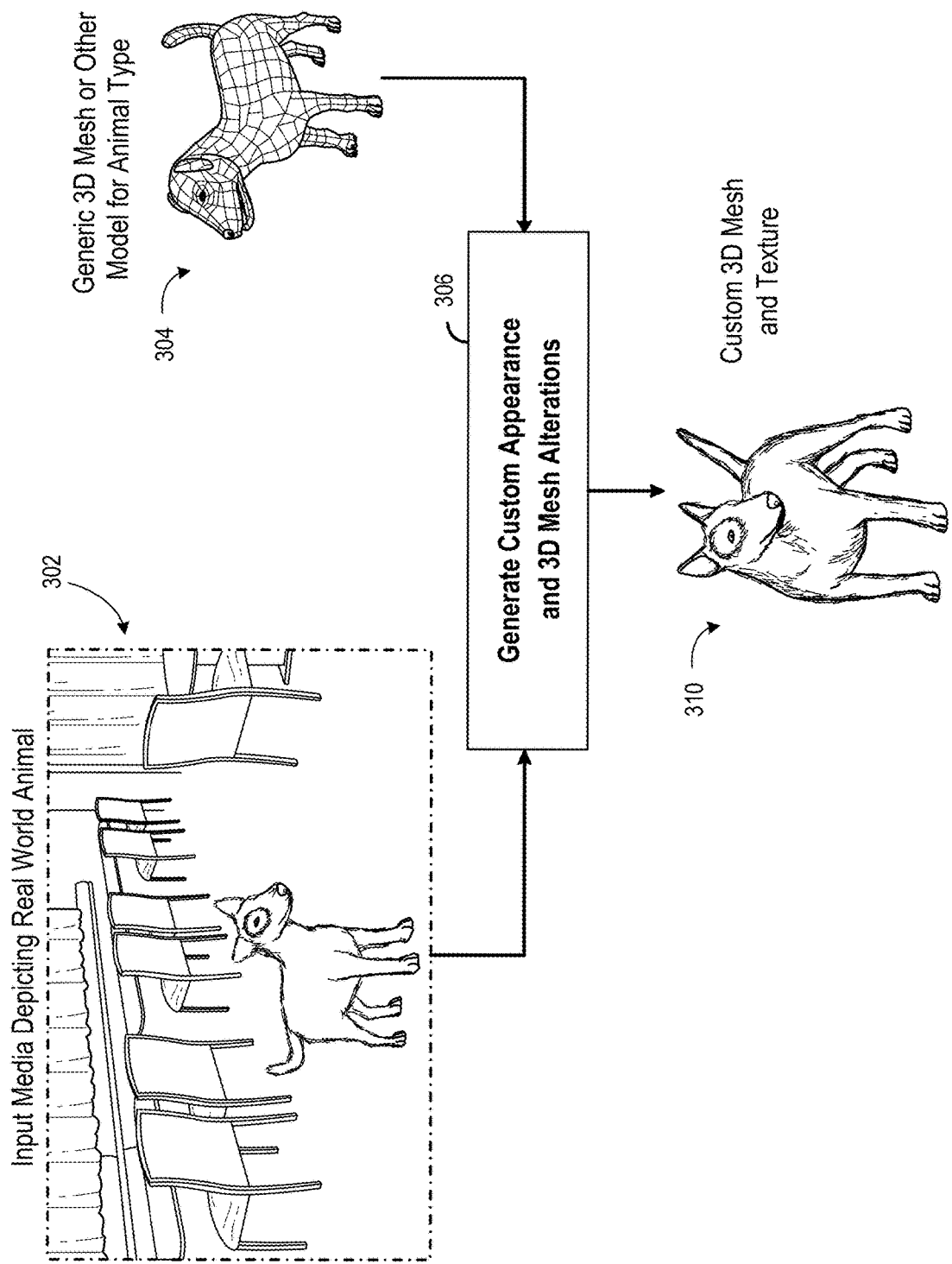
FIG. 3 provides a graphical depiction of example input media and a generic three dimensional (3D) mesh for a certain animal species, from which a custom 3D mesh and texture is generated, according to one embodiment.

FIG. 3 provides a graphical depiction of example input media 302 and a generic 3D mesh 304 for a certain animal species (in this case, a dog), from which a custom 3D mesh and applied texture 310 is generated, according to one embodiment. As illustrated, a single frame of video content 302 is provided as an example frame of input media. The video frame 302 may have been captured by a video camera and depicts a player's pet dog standing in a room. As will be appreciated, this may be one example video frame from a long video (e.g., potentially hours long), which may itself only be one of many different video files and images of the same dog analyzed by the custom character system 130. As illustrated, the generic 3D mesh 304 is a generic mesh for a dog, in this case for a particular breed of dog that matches or is similar to the breed of the dog depicted in input media 302.

The input media 302 is analyzed by the custom character system 130 at block 306 to generate custom appearance data (such as one or more custom texture images) and an altered version of the generic 3D mesh data 304, as will be described below with respect to FIG. 4. The result is graphically depicted as a 3D-rendered custom virtual dog character 310. The custom virtual dog character 310 may be rendered, for example, by applying the custom generated texture(s) to the modified 3D mesh and posing the resulting model in 3D virtual space (e.g., utilizing a virtual camera and light source, as is well known in the art). As illustrated, the custom virtual dog character 310 closely resembles the real life dog in input media 302. The similarities can be seen, for example, in the distinct marking around the left eye of the virtual dog character 310 (which may be from the custom generated texture) as well as the adjustments made to the 3D mesh 304 to modify the generic ears (now pointing up in virtual dog character 310) and the generic tail (straightened and elongated relative to the generic 3D mesh 304).

Figure 4:
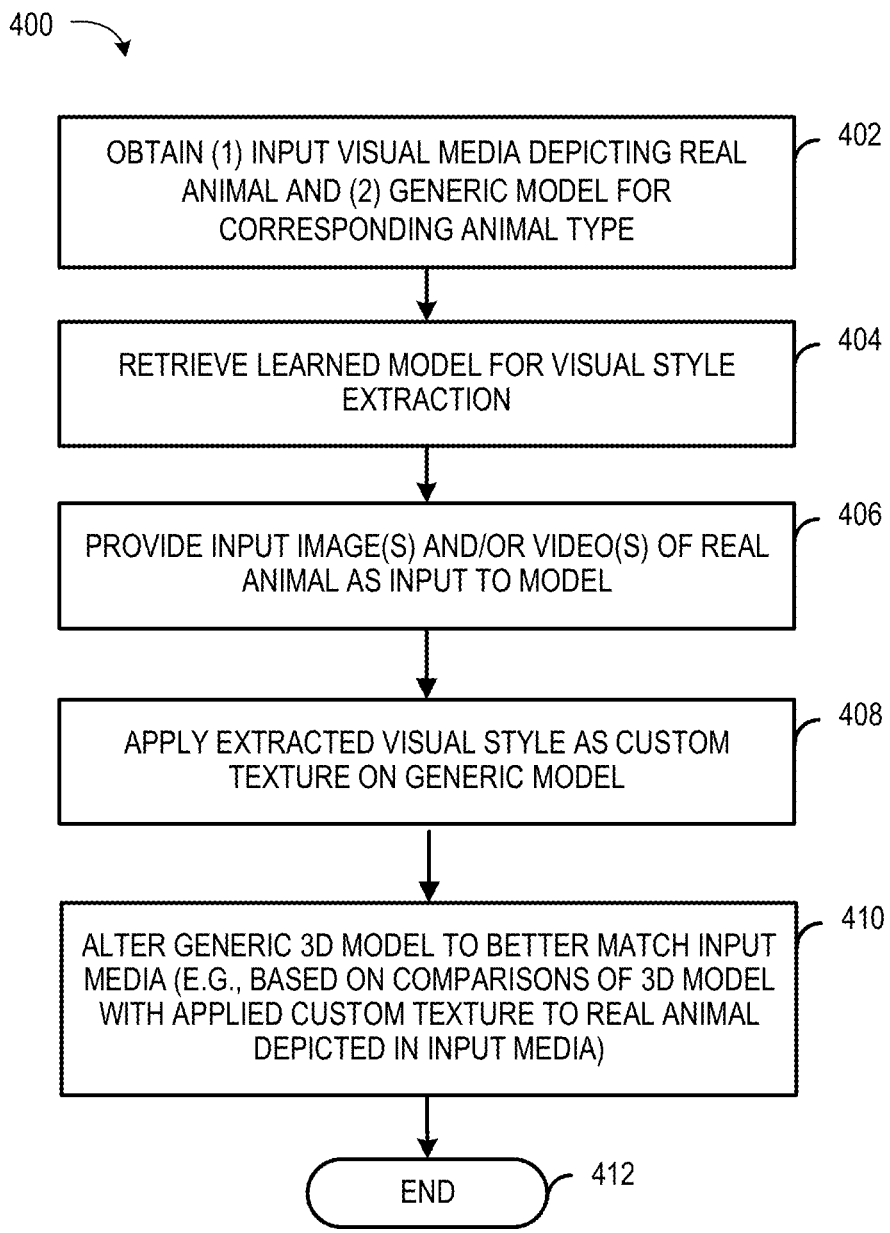
FIG. 4 is a flow diagram of an illustrative method for generating custom textures and 3D model data for a virtual animal character that appears visually similar to a particular real animal, according to some embodiments.

FIG. 4 is a flow diagram of an illustrative method 400 for generating custom textures and 3D model data for a virtual animal character that appears visually similar to a particular real animal, according to some embodiments. In some embodiments, the method 400, in whole or in part, can be implemented by a game application 104, a custom character system 130, a player computing system 102, an interactive computing system 120, or other application component or module. Although any number of systems, in whole or in part, can implement the method 400, to simplify discussion, the method 400 will be described with respect to particular systems or components of the custom character system 130.

The illustrative method 400 begins at block 402, where the custom character system 130 may obtain input visual media depicting a real animal, as well as generic model data for the corresponding animal type (both previously discussed above). In some embodiments the generic model data may include 3D mesh data for separate parts on a particular type of animal as modular components. For example, in some embodiments, portions of an animal such as horns, tail types, claws, manes, and others may be stored separately from the base model of a body and head. In other embodiments, the 3D mesh data may incorporate horns or other features within a comprehensive base 3D mesh for a particular species.

Next, at block 404, the appearance learning system 136 may retrieve, access or load into memory a learned model for visual style extraction. In some embodiments, the learned model may be a neural network model that applies style transfer or extraction techniques. As one example, the model may include a generative adversarial network (GAN), such as but not limited to a conditional generative adversarial network (cGAN), as further described below.

At block the 406, the appearance learning system 136 may provide input images and/or video data of the input media that depicts the real animal as input to the retrieved visual style extraction model. For example, the appearance learning system may apply an image-to-image translation using a cGAN. One known technique that may be utilized is known in the art as pix2pix, which includes applying edge-to-photo image-to-image translation using a GAN. For example, a GAN may be configured to learn mappings from input images to output images, and also learn a loss function to train this mapping. This makes it possible to apply a single approach to problems that may otherwise involve significantly different loss formulations. A GAN or cGAN applied at block 406 may take a generic visual model and/or texture (such as for edge extraction) and generate a full texture and/or other visual style elements that closely resemble the real life animal depicted in one or more input images and/or input video frames.

A cGAN employed at block 406, in some embodiments, may include a generator that generates a visual style (which may include generating one or more images for application as textures to a 3D mesh or other 3D model of the animal). The visual style output of the generator may be passed to a discriminator within the cGAN model to assess whether the discriminator determines that the generated visual appearance appears real or fake. In some embodiments, a "real" indication from the discriminator may indicate both that the discriminator considered the image to look like a real animal, and also to look like the particular animal depicted in the image. For example, the discriminator in one embodiment may be trained to identify if an image output by the generator depicts a real animal (or real animal of a particular species or breed), as well as configured to compare the image generated by the generator to one or more real images of a particular real animal (or extracted texture data from such an image) to assess a whether the differences fall within a threshold acceptable difference. If a particular visual style generated by the generator does not pass the discriminator's test, negative feedback is provided to the generator, which then tries again. Once the discriminator is "fooled" into labeling the generator's extracted visual style information as real, the method may proceed to block 408.

At block the 408, the appearance learning system 136 may apply the extracted visual style that was generated or output by the model in block 406 as a custom texture on the generic 3D model obtained at block 402. For example, the custom character system 130 or an associated 3D rendering engine may apply a 3D rendering or shading procedure in which the generating texture information and/or other visual style information (from block 406) is applied to the generic 3D mesh (retrieved at block 402), posed in 3D virtual space with one or more virtual lighting sources, and a particular virtual camera location. The custom character system 130 may initially attempt to match a pose of the 3D model and the model's position relative to the virtual camera to the pose and position of the real animal relative to a real camera in at least one input image or input video frame.

Then, at block the 410, the appearance learning system 136 may alter the generic 3D model to better match the depiction of the real animal in the input media. The alterations may be based on comparisons of the rendering of the 3D animal model (with the applied custom texture) to the real animal depicted in one or more images or video frames in the input media. A gradient descent approach may be used to repeatedly adjust the virtual camera's position and pose relative to the virtual animal model (as well as adjusting the pose of the 3D animal model, in some embodiments) until the virtual animal model is positioned and posed similarly to a position and pose of the real animal within a particular image or video frame of the input media.

The appearance learning system 136 may then adjust model parameters of the 3D model data to better match the real animal depicted in the corresponding input image of video frame. For example, if a 3D virtual dog as rendered closely matches the real dog in the input image but has shorter legs than the real dog, the appearance learning system 136 may change leg length parameters to elongate the 3D mesh of the virtual dog in the leg areas. As is known in the art, the model data may be associated with various rules and constraints for changing parameters of the model. For example, elongating the dog's legs may result in corresponding adjustments to the hips or other portions of the dog's body for realism. In some embodiments, modular add-on 3D data or templates, such as different tail style, a horn, claws, and/or others may be used in adjusting the 3D model data to better match the input media. In other instances, components or aspects of the 3D model data may be removed or minimized, such as shortening or removing a single limb (e.g., if a real dog depicted in input media only has three legs) or other feature (e.g., removing or drastically shortening a tail when the real dog has a docked tail).

Once the appearance learning system 136 has determined that sufficient modifications or alterations have been made to the 3D model data to match the input media within an acceptable threshold range of differences, the illustrative method 400 ends at block 412.

Figure 5:
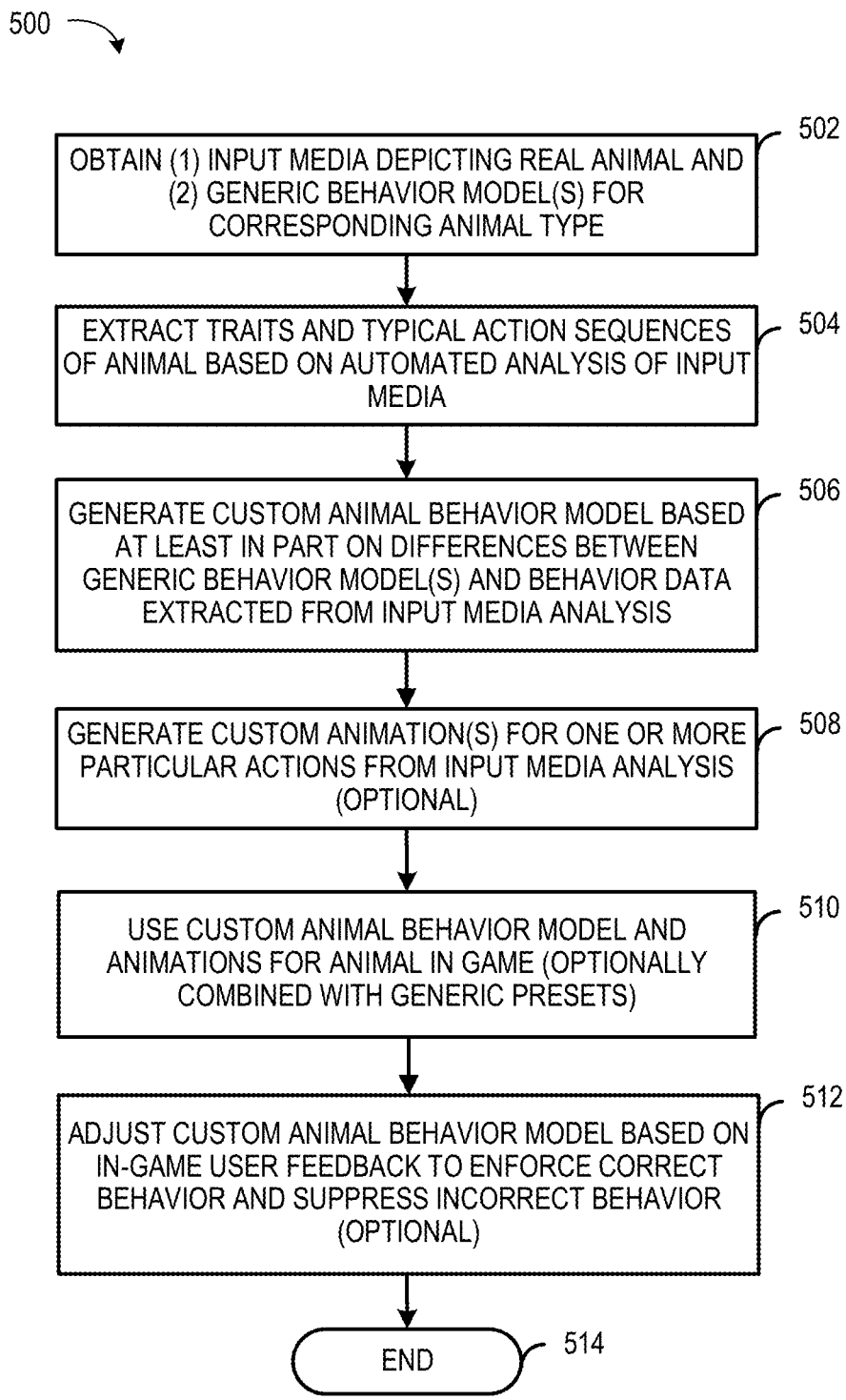
FIG. 5 is a flow diagram of an illustrative method for generating and storing a behavior model and custom animation data for a virtual animal character based on automated analysis of input media depicting a real life animal, according to some embodiments.

FIG. 5 is a flow diagram of an illustrative method 500 for generating and storing a behavior model and custom animation data for a virtual animal character based on automated analysis of input media depicting a real life animal, according to some embodiments. In some embodiments, the method 500, in whole or in part, can be implemented by a game application 104, a custom character system 130, a player computing system 102, an interactive computing system 120, or other application component or module. Although any number of systems, in whole or in part, can implement the method 500, to simplify discussion, the method 500 will be described with respect to particular systems or components of the custom character system 130.

The method 500 begins at block 502, where the custom character system 130 obtains input media depicting a real animal, as well as one or more generic behavior model(s) for the corresponding animal type. Obtaining input media has been described in detail above. The behavior model data and/or related animation data obtained may be in a variety of formats, such as behavior trees, rule sets, skeletal movement data, lists of action sequences, kinematic chains and/or other kinematic data, and/or other animation-related or behavior-related data known in the art of video game development. The obtained data may be particular to a given species or optionally breed of the animal, depending on the embodiment. Obtaining generic behavior models may be optional, in some embodiments. For example, in embodiments other than that illustrated in FIG. 5, a custom behavior model may be generated without reference to a default behavior model, but then may be optionally supplemented by generic or default behaviors later on.

At block 504, the behavior learning system 134 may extract or determine traits and typical action sequences of the animal depicted in the input media based on an automated analysis of the input media. In some embodiments, this analysis may include applying at least one of semantic analysis, Markov models, deep neural networks or other machine learning models, movement classification models, pose analysis models, and/or other approaches. In one embodiment, a machine learning model may be configured to analyze images or videos in order to label animal poses or movements as a particular behavior selected from many behaviors that the model was trained to recognize or classify, such as playing, sleeping, jumping, running, begging, barking, etc. In some embodiments, a machine learning model or classification model may have been trained to identify a particular action (such as jumping) by providing the model with training video depicting a number of animals jumping. In other embodiments, the behavior learning system 134 may compare the real animal's skeletal or kinematic motion or movements extracted from the input video to stored model movements or motions that have been labeled as a certain action in a data store (such as a jumping animation) to identify the closest stored action or animation to the observed action or behavior.

For example, the behavior learning system 134 may analyze a long video file or stream of video data (such as many minutes or many hours), label time stamps or frames in the video in which particular behaviors or actions are identified, link successive behaviors or actions as action sequences (e.g., sleep, then stand up, then walk to food, then eat, etc.), then compile statistics of the frequency and length of the various observations in order to apply a Markov analysis or model to predict behavior of the animal. The processes implemented at block 506 and/or block 508 may include an ensemble of Markov models as well as deep neural network models, in some embodiments. Additionally, one or more models may be configured to identify overall traits (e.g., friendly, aggressive, nice, mean, independent, dependent, etc.) based on frequency of certain poses, actions, expressions, behaviors, object interactions, and/or other features exhibited in the input media.

Next, at block 506, the behavior learning system 134 may generate one or more custom animal behavior models based at least in part on differences between the generic behavior model(s) obtained at block 502 and behavior data extracted or determined from the input media analysis at block 504. For example, the behavior learning system 134 either as part of block 506 or block 508, may generate a list of actions, behaviors, sequences of actions, or similar behavior information observed of the real animal in the input media, which may be in the form of behavior trees, action sequences, and/or other formats. For example, the behavior learning system 134 may have determined that after waking up from sleep, a particular dog stretches 60% of the time and rolls over 40% of the time. The behavior learning system 134 may incorporate these statistics or likelihoods of certain actions into a stored behavior model, such as a behavior tree. In some embodiments, the custom behavior model may be generated as a modified version of the base behavior model. For example, a generic or base behavior model for a dog may already include hundreds of potential actions or behaviors arranged in a behavior tree, and the behavior learning system 134 may alter the propensities for the customized virtual dog to engage in particular actions in particular orders when there is significant deviation from the standard behaviors and the particular observed dog's behaviors.

For example, the standard dog behavior model may indicate that a generic dog would only rarely turn in a complete small circle, and that this would be most likely to occur when a dog is acting playful or running around. In contrast, the behavior learning system 134 may have observed that the particular real dog in the input video frequently walked in a complete small circle immediately before lying down. Thus, the behavior learning system 134 may alter the generic dog behavior data when generating the custom behavior model such that the custom model increases the likelihood (relative to the generic model) that the virtual dog will turn in a complete circle, and sets a high likelihood that the next action by the virtual dog will be to lie down.

In some embodiments, individual behaviors or actions in the behavior model may be linked or associated with environmental stimuli or objects. For example, the behavior data may indicate that the particular dog is very likely to jump on a flat surface near the dog's head height, such as tables. Accordingly, when this behavior is applied with respect to the virtual dog character within a particular video game, the virtual dog character may be likely to jump on nearby tables that the virtual dog character encounters within a virtual environment of the game.

At block 508, the behavior learning system 134 may optionally generate one or more custom animations for one or more particular actions. For example, the behavior learning system 134 may extract kinematic data, skeletal movements, or similar information from input video of the real animal in order to detect that the animal performs one or more unique actions (or a common action in a unique way) relative to previously stored generic movement or animation data for the generic animal of the given species. For example, the behavior learning system 134 may identify a strange behavior in the input video, such as a dog performing a backflip, or an unusual style of walking. In response to such an observation, the behavior learning system 134 may store the observed skeletal movements or animation data either as a new unique action for the given virtual animal character (such as in the case of a back flip or other previously unknown action) or as a replacement or override of a corresponding standard animation for a preset action (such as in the case of an unusual walk, like walking with a limp).

The action or pose information extracted from the video at blocks 504, 506 and/or 508 may be determined in a number of ways. For example, the behavior learning system 134 may employ one or more known methods for estimating 3D pose and skeletal movement information from video data captured from a single traditional video camera. As an example according to some embodiments, a convolutional neural network (CNN) may be employed as part of a pose regressor with kinematic skeleton fitting. Such a CNN-based model may regress 2D and 3D joint positions. A kinematic skeleton fitting method may then use output of the CNN to generate 3D pose reconstructions based on a kinematic skeleton. In some embodiments, 2D keypoints may be determined for various joints, which then may be used to estimate 3D pose information in individual frames, which may then be combined to global 3D pose estimates using skeleton fitting across frames.

At block 510, the behavior learning system 134 may use the custom animal behavior model (optionally combined with generic presets, such as for the given animal's species) when animating the virtual animal character in a game, such as game application 104. For example, the virtual animal character with its associated visual appearance and custom behavior model may be incorporated as an NPC or player-controlled character in a particular video game or in any of a number of different video games. The custom virtual character data may be stored by the custom character system 130 in one or more formats that are used by one or more particular video games, such that the custom character may be rendered within the particular game's virtual environment in the same manner as any of the game's standard developer-designed characters. The custom virtual character may respond to in-game stimuli or objects in accordance with the custom behavior model generated above.

At block 512 the behavior learning system 134 may optionally adjust the custom animal behavior model based on in-game user feedback in order to enforce correct behavior and suppress incorrect behavior within the model. For example, the custom character system 130 or a particular game may provide user input mechanisms (such as an assigned key or button, or a user interface element) that enable the user to indicate if a particular custom action or behavior performed by the virtual animal character in a game is either accurate or inaccurate relative to how the real life animal would behave (discussed further below with respect to FIG. 6). These player inputs may then be provided as positive or negative reinforcement in a learning process by the behavior learning system 134 to enforce correct behavior and suppress incorrect behavior for the particular virtual animal character. The method 500 ends at block 514.

Example Feedback User Interface

Figure 6:
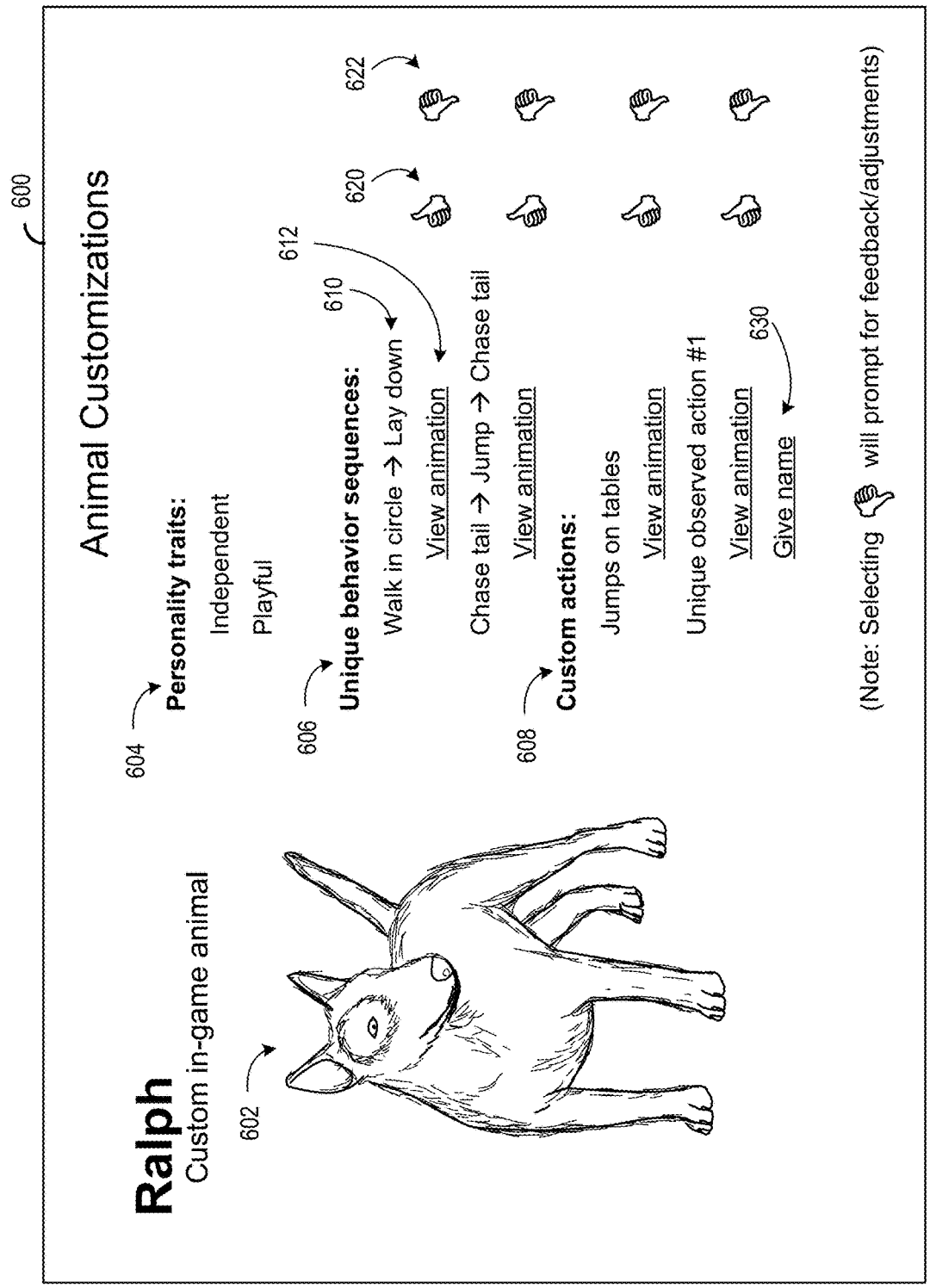
FIG. 6 is an illustrative user interface for receiving player feedback regarding a generated virtual animal character, according to one embodiment.

FIG. 6 is an illustrative user interface 600 for receiving player feedback regarding a generated virtual animal character, according to one embodiment. Depending on the embodiment, the user interface 600 may be generated in whole or in part by a game application 104, the interactive computing system 120, the custom character system, or an application component or module. As illustrated, the user interface 600 may be presented by the player computing system 102 by a game application 104 that has been configured to communicate with the custom character system 130 in order for the player to create a custom virtual animal character for use in the particular game application 104.

The user interface 600 may be presented after the custom character system has generated a custom virtual animal character 602 (in this case, a virtual dog that the player has named Ralph, which may be a virtual version of the player's real dog Ralph). As indicated by personality traits 604, the custom character system has determined that the dog's traits include independent and playful. The user interface also includes identification of unique behavior sequences 606 that the custom character system determined from input media depicting the player's dog, as well as custom actions or animations 608 that the custom character system determined from input media depicting the player's dog.

As one example, a behavior sequence 610 indicates a sequence of actions whereby the virtual dog walks in a circle and then lays down. The player may select "View animation" option 612 in order to see a rendering of the virtual dog character 602 performing the sequence of actions 610. If the player agrees that sequence 610 accurately reflects behavior of the player's real dog, the player may select "thumbs up" option 620 to provide positive reinforcement in the behavior learning process of the custom character system. Alternatively, if the player thinks that sequence 610 does not accurately reflect behavior of the player's real dog, the player may select "thumbs down" option 622 to provide negative reinforcement in the behavior learning process of the custom character system.

As additional player input, the player may enter a name for a particular observed action by selecting option 630. The corresponding action has been automatically named by the custom character system as "unique observed action #1," which may indicate that the custom character system could not identify any generic or pre-stored action for the given animal species that resembled a certain unique action observed by the custom character system in input media depicting the player's real animal. For example, the action may have been that the player's real dog makes a clapping motion with its front paws, which the custom character system had never observed with respect to other dogs and thus created a custom animation for this particular virtual dog character 602.

Overview of Computing Device

Figure 7:
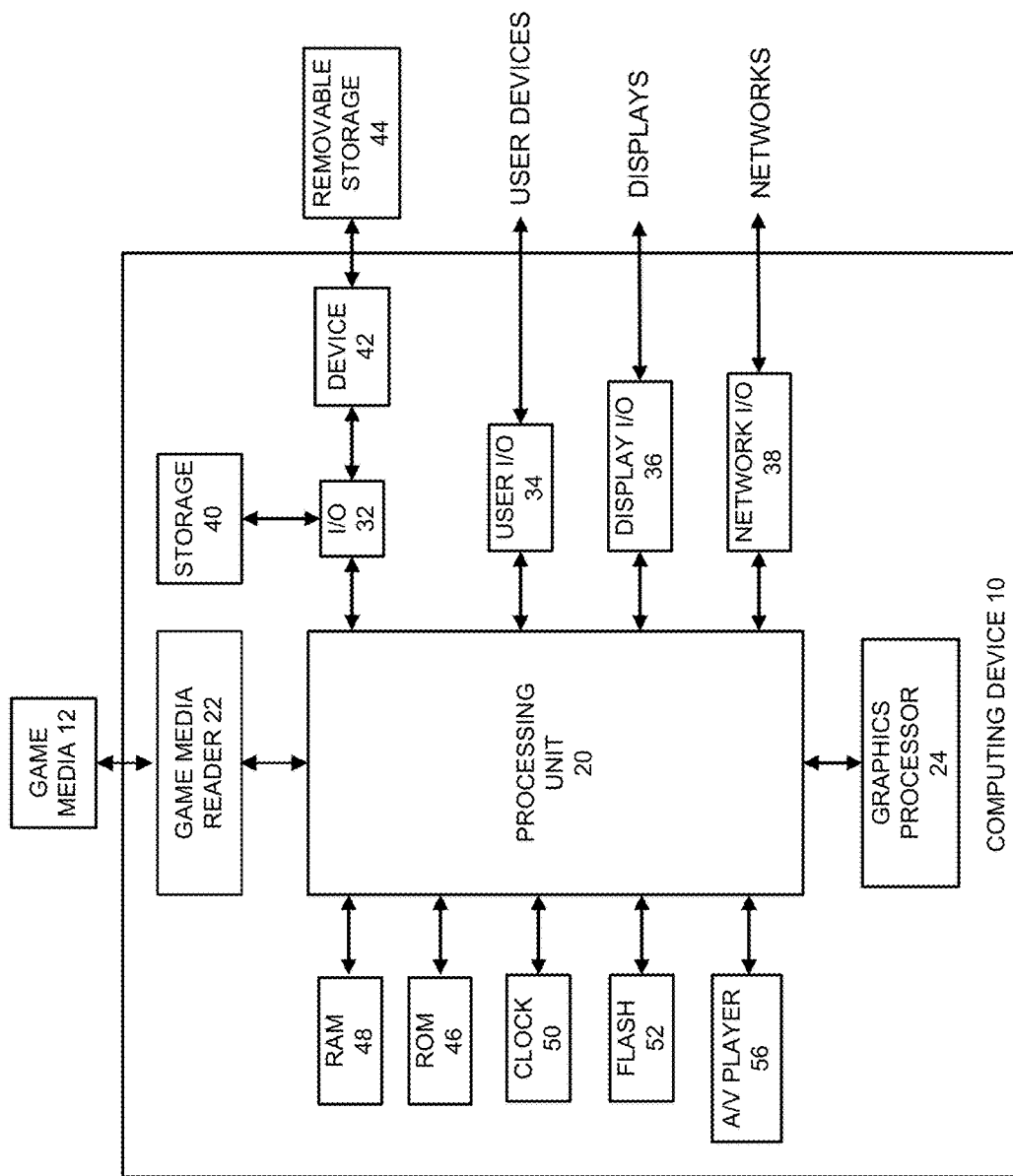
FIG. 7 illustrates an embodiment of a computing device that may implement aspects of the present disclosure.

FIG. 7 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers. In some embodiments, the player computing system 102 may include one or more of the components illustrated in FIG. 7, while in other embodiments, the interactive computing system 120 may include one or more of the components illustrated in FIG. 7.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
    a data store that stores three-dimensional (3D) model data for each of a plurality of animal types; and
    a computing system in electronic communication with the data store and configured to execute computer-readable instructions that configure the computing system to:
        obtain input media depicting a real animal, wherein the input media comprises at least a video recording of the real animal as captured by a camera;
        automatically in response to obtaining the input media, generate custom behavior data using one or more machine learning models, wherein the custom behavior data is generated without human interaction after receiving the obtained input media, wherein the generating the custom behavior data comprises configuring the computing system with the computer-readable instructions to:
            determine that the real animal is of a first animal type based at least in part by providing the input media as input to one or more neural networks;
            retrieve base 3D model data from the data store by identifying, from among the 3D model data for the plurality of animal types, the base 3D model data that corresponds to the first animal type;
            provide at least a portion of the input media to a first machine learning model configured to extract skeletal movement information for each of a plurality of actions regarding one or more animals depicted in image or video data;
            alter the base 3D model data for the first animal type based on skeletal movement information extracted by the first machine learning model to generate custom 3D model data corresponding to the real animal for each of the plurality of actions;
            determine behavior of the real animal depicted in video data by providing the input media to a second machine learning model configured to determine behavior of one or more animals depicted in video data in response to a real world stimuli or action; and
            generate the custom behavior data for that includes rule sets that, in response to one of: an in-game action or a change in a virtual environment that corresponds to the real world stimuli or action in at least one video game, indicates movements by a virtual animal character, wherein the movements include (a) a sequence of actions performed by the real animal as depicted in the input media and (b) skeletal movement information associated with the sequence of actions performed by the real animal as depicted in the input media;
        instantiate an instance of a 3D virtual environment of a video game;
        render, within the 3D virtual environment of the video game, the virtual animal character that resembles the real animal; and
        in response to receiving an indication of the in-game action or the change in the virtual environment in the video game that corresponds to the real world stimuli or action, render the virtual animal character performing one or more movements indicated in the rule sets, wherein a visual appearance of the virtual animal character as rendered is based at least in part on the custom 3D model data, wherein the one or more actions are based at least in part on the custom behavior data, wherein the one or more movements include the sequence of actions, wherein each of the actions are performed based on the skeletal movement information.

2. The system of claim 1, wherein the computer-readable instructions further configure the computing system to:
    store, in the data store, custom virtual animal character data corresponding to the real animal, wherein the custom virtual animal character data includes at least the custom 3D model data and the custom behavior data.

3. The system of claim 1, wherein the computer-readable instructions further configure the computing system to:
    provide the custom virtual animal character data to two or more video game applications for incorporation of the virtual animal character into virtual worlds associated with each of the two or more video game applications.

4. The system of claim 1, wherein an individual animal type of the plurality of animal types comprises at least one of an animal species or breed.

5. The system of claim 1, wherein the custom 3D model data corresponding to the real animal comprises a custom texture extracted from the input media.

6. The system of claim 1, wherein the first machine learning model comprises a generative adversarial network that includes a generator and a discriminator.

7. The system of claim 1, wherein the second machine learning model comprises a convolutional neural network, wherein the computing system is configured to apply kinematic skeleton fitting to output of the convolutional neural network.

8. A computer-implemented method comprising:
under the control of a computer system comprising computer hardware, the computer system configured with computer executable instructions:
obtaining input media depicting a real animal as captured by a camera;
automatically in response to obtaining the input media, generating custom behavior data using one or more machine learning models, wherein custom behavior data is generated without human interaction after receiving the obtained input media, wherein the generating the custom behavior data comprises:
determining that the real animal is of a first animal type based at least in part by providing the input media as input to one or more neural networks;
obtaining base three-dimensional (3D) model data from a data store storing 3D model data for each of a plurality of animal types by identifying, from among the 3D model data for the plurality of animal types, the base 3D model data that corresponds to the first animal type;
providing at least a portion of the input media to a first machine learning model configured to extract skeletal movement information for each of a plurality of actions regarding one or more animals depicted in image or video data;
modifying the base 3D model data based on skeletal movement information extracted by the first machine learning model to generate custom 3D model data corresponding to the real animal for each of the plurality of actions;
determining behavior of the real animal depicted in video data by providing the input media to a second machine learning model configured to determine behavior of one or more animals depicted in image or video data in response to a real world stimuli or action; and
generating the custom behavior model that includes rule sets that, in response to one of: an in-game action or a change in a virtual environment that corresponds to the real world stimuli or action in at least one video game, indicates movements by a virtual animal character, wherein the movements include a sequence of actions performed by the real animal as depicted in the input media;
instantiating an instance of a 3D virtual environment of a video game;
rendering, within the 3D virtual environment of the video game, the virtual animal character that resembles the real animal; and
in response to receiving an indication of the in-game action or the change in the virtual environment in the video game that corresponds to the real world stimuli or action, rendering the virtual animal character performing one or more movements indicated in the rule sets, wherein a visual appearance of the virtual animal character as rendered is based at least in part on the custom 3D model data, wherein the one or more actions are based at least in part on the custom behavior model, wherein the one or more movements include the sequence of actions, wherein each of the actions are performed based on the skeletal movement information.

9. The computer-implemented method of claim 8, further comprising rendering, within a 3D virtual environment of a video game, a series of frames for display that depict the custom virtual animal character that resembles the real animal performing one or more actions, wherein a visual appearance of the virtual animal character as rendered is based at least in part on the custom 3D model data, wherein the one or more actions are based at least in part on the custom behavior model.

10. The computer-implemented method of claim 8, wherein the custom behavior model further includes skeletal movement information associated with an action performed by the real animal as depicted in the input media.

11. The computer-implemented method of claim 10 further comprising determining that the real animal performs the action in the input media in a manner that deviates from a standard corresponding action stored in a generic behavior model.

12. The computer-implemented method of claim 8, wherein the custom behavior model comprises a behavior tree.

13. The computer-implemented method of claim 8, wherein generating the custom behavior model includes application of at least one of a Markov model or a deep neural network.

14. The computer-implemented method of claim 8 further comprising:
receiving user feedback indicating that the custom virtual animal character behaved within a virtual world of a video game in a manner inconsistent with real world behavior of the real animal; and
in response to the user feedback, modifying at least a portion of the custom behavior model to suppress one or more behaviors corresponding to the user feedback.

15. A non-transitory computer-readable storage medium having stored thereon computer-readable instructions that, when executed, configure a computing system to:
obtain input media depicting a real animal;
automatically in response to obtaining the input media, generate custom behavior data using one or more machine learning models, wherein the custom behavior data is generated without human interaction after receiving the obtained input media, wherein the generating the custom behavior data comprises configuring the computing system with the computer-readable instructions to:
determine that the real animal is of a first animal type based at least in part by providing the input media as input to one or more neural networks;
obtain base three-dimensional (3D) model data from a data store storing 3D model data for each of a plurality of animal types by identifying the base 3D model data that corresponds to the first animal type;
provide at least a portion of the input media to a first machine learning model configured to extract skeletal movement information for each of a plurality of actions regarding one or more animals depicted in image or video data;
modify the base 3D model data based on skeletal movement information extracted by the first machine learning model to generate custom 3D model data corresponding to the real animal for each of the plurality of actions;

determine behavior of the real animal depicted in video data by providing the input media to a second machine learning model configured to determine behavior of one or more animals depicted in image or video data in response to a real world stimuli or action; and generate the custom behavior model that includes rule sets that, in response to one of: an in-game action or a change in a virtual environment that corresponds to the real world stimuli or action in at least one video game, indicates movements by a virtual animal character, wherein the movements include a sequence of actions performed by the real animal as depicted in the input media;

instantiate an instance of a 3D virtual environment of a video game;

render, within the 3D virtual environment of the video game, the virtual animal character that resembles the real animal; and in response to receiving an indication of the in-game action or the change in the virtual environment in the video game that corresponds to the real world stimuli or action, render the virtual animal character performing one or more movements indicated in the rule sets, wherein a visual appearance of the virtual animal character as rendered is based at least in part on the custom 3D model data, wherein the one or more actions are based at least in part on the custom behavior model, wherein the one or more movements include the sequence of actions, wherein each of the actions are performed based on the skeletal movement information.

16. The non-transitory computer-readable storage medium of claim 15, wherein the instructions further configure the computing system to render, within a 3D virtual environment of a video game, a series of frames for display that depict the custom virtual animal character that resembles the real animal performing one or more actions, wherein a visual appearance of the virtual animal character as rendered is based at least in part on the custom 3D model data, wherein the one or more actions are based at least in part on the custom behavior model.

17. The non-transitory computer-readable storage medium of claim 15, wherein the real animal is a real pet of a video game player, and wherein the input media is obtained from at least one of (a) a computing device of the video game player or (b) a third party media account associated with the video game player.

18. The non-transitory computer-readable storage medium of claim 17, wherein at least a portion of the input media is obtained from at least one of: a social network account, a cloud storage service, a home security video camera service, or a pet camera video monitoring service.

19. The non-transitory computer-readable storage medium of claim 17, wherein the input media comprises video data having a duration of at least a plurality of minutes.

20. The non-transitory computer-readable storage medium of claim 15, wherein the instructions further configure the computing system to:

receive user feedback indicating that the custom virtual animal character behaved within a virtual world of a video game in a manner inconsistent with real world behavior of the real animal; and modify at least a portion of the custom behavior model to suppress one or more behaviors corresponding to the user feedback.

* * * * *

UNITED STATES PATENT AND TRADEMARK OFFICE
CERTIFICATE OF CORRECTION

PATENT NO. : 11,276,216 B2
APPLICATION NO. : 16/366953
DATED : March 15, 2022
INVENTOR(S) : Igor Borovikov Page 1 of 1

It is certified that error appears in the above-identified patent and that said Letters Patent is hereby corrected as shown below:

On the Title Page

On Page 2, Column 2, Line 12, under Other Publications, delete "Apsi Pa" and insert --AP SIP A--.

In the Specification

In Column 1, Line 36, delete "for the" and insert --for--.

In the Claims

In Column 24, Claim 1, Line 17, delete "data for" and insert --data--.

Signed and Sealed this
Second Day of August, 2022

Katherine Kelly Vidal
*Director of the United States Patent and Trademark Office*